June 29, 1948.   W. J. GARTZ   2,444,401
VALVE
Filed Jan. 5, 1945
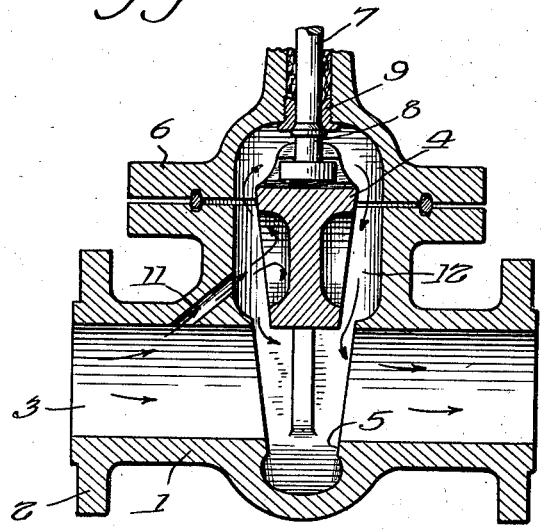
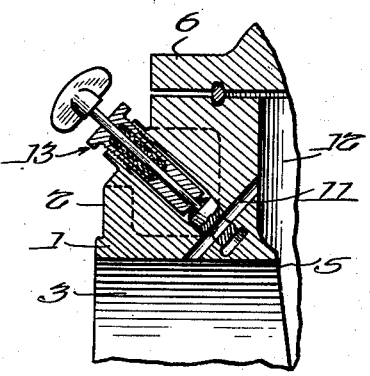
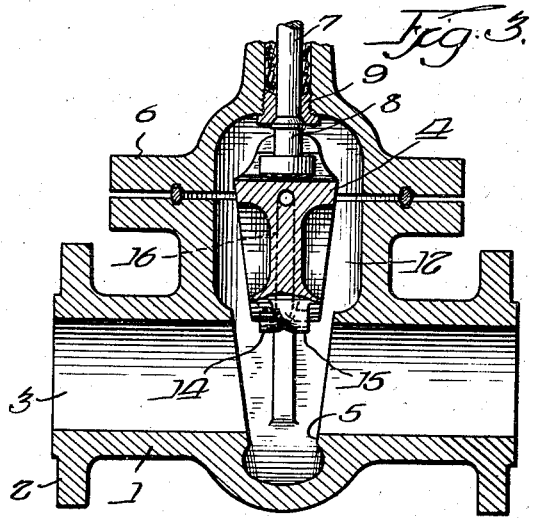
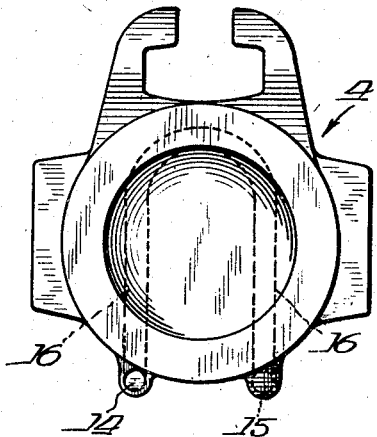
Inventor:
William J. Gartz
By Joseph O. Lange
Atty.

Patented June 29, 1948

2,444,401

UNITED STATES PATENT OFFICE 2,444,401

VALVE

William J. Gartz, Chicago, Ill., assignor to Crane Co., Chicago, Ill., a corporation of Illinois Application January 5, 1945, Serial No. 571,699

3 Claims. (Cl. 251—51)

This invention relates to valves, and more particularly to gate valves although, as will hereinafter become apparent, it is applicable to other types of valves employing reciprocably movable closure members. At the outset, in order to acquire a better understanding of the background of this invention, it should be realized that it has long been a problem, in connection with valve design, to provide means for equalizing the temperatures between the closure member and the casing so as to obtain desirable normal depth of seating and wedging action during the valve seating or closing operation. For example, it has been the experience that where a valve operator has seated a valve while the latter is hot, upon subsequent cooling the disc is pinched or clamped firmly between the faces of the valve seat thereby making it virtually impossible in many instances to open the valve.

Therefore as a remedy for this objectionable condition it is an important object of this invention to provide a novel valve construction in which a stream or plurality of the hot line fluid is caused to circulate and impinge upon the discs and thereby to substantially equalize the disc and body temperatures and thus overcome the resultant difference of expansion problem hereinabove referred to.

Another object is to provide a valve construction in which either the closure member or the casing or both may be suitably equipped to provide for uniform distribution of the line temperature within the valve proper during the course of normal operation.

Other objects and advantages of the invention will become apparent upon proceeding with the description read in light of the accompanying drawing, in which Fig. 1 is a fragmentary sectional assembly view of a valve embodying my invention.

Fig. 2 is a fragmentary sectional view showing a modified application of the invention employing a valved control means.

Fig. 3 is a fragmentary sectional assembly view of a further modified form of the invention.

Fig. 4 is an enlarged front view of the disc or closure member embodying the modification disclosed in Fig. 3.

Similar reference characters refer to similar parts throughout the several views.

Referring now to Fig. 1, a conventional gate valve body 1 is shown having the usual end connecting flanges 2. Obviously other forms of connections may be used without detracting from the application of this invention. The valve body 1 is provided with the usual port 3 extending therethrough, the line flow for purpose of indicating the application of my invention being shown by the direction of the arrows. In the particular embodiment shown the disc or closure member 4 which seats on the annular raised portions 5 is shown in the raised or open position of the valve. The body at its upper portion is provided with the conventional bonnet 6, the stem 7 having the operative connection with the disc, as at 8; the stem is journaled within the stem hole bushing 9. The stem and disc are reciprocably movable by means of the usual actuating mechanism, such as stem threads or a handwheel (not shown), or else the valve may be operated by such drives as hydraulic, air, or electric means. The bonnet is held to the body by means of bolts (not shown). The description thus far has been directed to a conventional valve.

Heretofore, valve operators have been confronted with the problem of objectionably sticking closure members. This condition arises when seating the closure member 4 against the faces 5. It has been found that because the closure member in the open position of the valve is normally positioned in the bonnet chamber or cavity 12 it is at a lower temperature than the body and consequently is not proportionately expanded relative to the body when later subjected to the higher temperatures encountered during the course of seating. As a result, the closure member will seat slightly lower within the body than if its temperature were substantially the same as that of the body. Upon cooling, the body will accordingly pinch the disc firmly between the seats 5 and hold it tighter than usual. Obviously, under such circumstances this causes extreme difficulty in opening the valve.

The novel valve construction about to be described provides for a bypass passage 11 which, as indicated by the arrows, directs a stream of the hot line media onto the disc 4, thereby serving to keep the disc temperature practically at the body or housing temperature and assuring normal seating and wedging. The directed stream of line media will circulate within the bonnet chamber 12 as indicated by the arrows. As shown in the modified form of construction shown in Fig. 2, the bypass 11 may be provided with a valve generally referred to as 13 whereby the flow through the bypass may be controlled, if desired. Obviously the type of valve employed may vary depending upon the service and the kind of line media encountered.

As shown in the further modified form of construction shown in Fig. 3, the body 1 need not necessarily be provided with the bypass 11. Instead, the internal pasages 16 in the disc or closure member 4 may be provided, the ends of which passages preferably have a Pitot tube extended in opposite directions, that is, one facing upstream, the other downstream, the passages 16 being in loop form as shown more clearly in Fig. 4. The upstream passage is designated 14 while the downstream is 15. It should be understood of course that the passage may be mold cored or otherwise formed in the disc during the time in which the pattern is being molded or formed. It will further become apparent because of the positive pressure on the open end 14 of the passage pointing upstream and the negative or suction effect on the end 15 of the valve pointing downstream that when the valve is in the open position as illustrated the hot line media flowing through the valve is caused to move through the internal passages 16 in the disc and thus act as a desirable heating means. The arrangement of the latter passages may vary substantially from that illustrated and described. Thus the temperature of the disc is raised to a level to closely approximate that of the body temperature and assures the normal depth of seating and the desirable wedging action in the course of operating the valve. A varied Pitot tube effect may be employed to a greater or lesser extent by changing the shape of the respective inlet and outlet portions of the passages 16.

It is further apparent that the detailed manner in which the line media is directed toward the closure member of the valve may vary considerably. It is therefore the desire not to be limited other than as covered in the appended claims read in light of the art.

I claim:

1. Means for maintaining substantially uniform temperatures within a valve, the said means comprising in combination a valve housing, a closure member therefor, diverting means on said closure member for directing a portion of the line flow to an upper portion of the closure member when the said closure member is in the open position of the valve, the said diverting means on the closure member including a passage therewithin in communication with the inlet of the valve.

2. In a valve, means for equalizing line temperatures between a valve closure member and a valve casing, the said means including a passage within the closure member having communication with the inlet and outlet side portions of the valve in the open position of the valve, the passage being of substantially U form, each end of the passage being initially in the direction respectively of the inlet and the outlet.

3. In a valve or the like, means for equalizing line temperatures between a valve closure member and a valve casing, the said means including a pasage within the closure member having communication with the inlet and outlet of the valve, the passage extending through the closure member to contact a substantial portion of the interior of the closure member whereby substantially uniform heat transfer areas are obtained between the passage and adjacent portions of the closure member.

WILLIAM J. GARTZ.

REFERENCES CITED

The following references are of record in the file of this patent:

UNITED STATES PATENTS

| Number | Name | Date |
| --- | --- | --- |
| 772,007 | Theis | Oct. 11, 1904 |
| 876,625 | De Remer | Jan. 14, 1908 |
| 1,358,968 | Mattern | Nov. 16, 1920 |
| 1,587,921 | Ray | June 8, 1926 |
| 2,034,222 | Baker | Mar. 17, 1936 |